(12) United States Patent
Moten

(10) Patent No.: US 10,241,476 B1
(45) Date of Patent: Mar. 26, 2019

(54) WRISTWATCH CONFIGURED TO PROVIDE WIRELESS CHARGING

(71) Applicant: Joshua Moten, Jacksonville, AL (US)

(72) Inventor: Joshua Moten, Jacksonville, AL (US)

(*) Notice: Subject to any disclaimer, the term of this patent is extended or adjusted under 35 U.S.C. 154(b) by 0 days.

(21) Appl. No.: 15/725,199

(22) Filed: Oct. 4, 2017

(51) Int. Cl.
*G04G 19/00* (2006.01)
*H01F 38/14* (2006.01)
*H02J 7/02* (2016.01)

(52) U.S. Cl.
CPC ........... *G04G 19/00* (2013.01); *H01F 38/14* (2013.01); *H02J 7/025* (2013.01)

(58) Field of Classification Search
CPC ........ G04G 19/00; G04G 17/04; G04G 17/00; G04C 10/00; G04C 3/008; H02J 7/025; H01F 38/14
USPC .................................................. 368/204, 281
See application file for complete search history.

(56) References Cited

U.S. PATENT DOCUMENTS

| 2014/0375246 | A1* | 12/2014 | Boysen, III | H02J 5/005 320/101 |
| 2015/0102879 | A1* | 4/2015 | Jacobs | H01F 7/0247 335/294 |
| 2015/0364938 | A1* | 12/2015 | Lapetina | H01F 27/365 320/114 |
| 2016/0062319 | A1* | 3/2016 | Kim | G04C 10/00 368/204 |

* cited by examiner

*Primary Examiner* — Edwin A. Leon
(74) *Attorney, Agent, or Firm* — Gulf Coast Intellectual Property Group

(57) ABSTRACT

A wristwatch configured to provide inductive charging of a smart phone proximate thereto. The wristwatch includes a body having an interior volume. Disposed within the interior volume is a battery that is operable to provide power for operation of the wristwatch. Located in the interior volume of the body is a first coil. The first coil is constructed from copper windings and is centrally located within the interior volume and electrically coupled to the battery. A second coil is surroundably present around the first coil in the interior volume of the body. The first coil and second coil function to provide an electromagnetic field generating an induced current so as to provide inductive charging of a smart phone proximate the wristwatch. The wristwatch further includes a central processing unit configured to control operations thereof. A display is included that is configured to provide time information.

7 Claims, 3 Drawing Sheets

WRISTWATCH CONFIGURED TO PROVIDE WIRELESS CHARGING

FIELD OF THE INVENTION

The present invention relates generally to charging systems, more specifically but not by way of limitation a wristwatch charging apparatus that is configured to provide wireless charging of a handheld device such as but not limited to a smart phone upon the wristwatch charging apparatus and the smart phone being proximate each other.

BACKGROUND

Numerous types of electronic devices are routinely utilized by individuals on a daily basis. Electronic devices such as but not limited to music players and smart phones are quite common amongst a large demographic. The aforementioned devices typically have a rechargeable battery that is operable to provide the necessary power for operation of the device. Conventional batteries such as but not limited to lithium ion batteries are typically utilized to provide power for operation of the devices. These batteries routinely provide sufficient power in order to operate the device for several hours but ensuing operation for several hours it is required that the battery must be recharged.

One problem with the requirement for consistent recharging of the battery for devices such as but not limited to a smart phone is the readily available access to a power supply. Smart phones and other devices are typically charged utilizing a charging device that is plugged into a conventional AC and/or DC power supply. Often during the day users of the aforementioned devices do not have access to conventional power sources and as a result the devices power supply can be depleted and render the device inoperable until the battery can be recharged.

Accordingly, there is a need for a charging apparatus that can be operably coupled to a device such as but not limited to a smart phone wherein the charging apparatus is worn on the wrist of a user and is configured to produce an electromagnetic field so as to provide an electrical current to the battery of the device in order to facilitate charging thereof.

SUMMARY OF THE INVENTION

It is the object of the present invention to provide a wrist worn charging apparatus configured to provide wireless charging of a device such as but not limited to a smart phone wherein the wrist worn device has a preferred embodiment of a wristwatch.

Another object of the present invention is to provide a wristwatch charging apparatus operable to provide wireless charging of a smart phone proximate thereto that further includes a body wherein the body has an interior volume.

A further object of the present invention is to provide a wristwatch charging apparatus configured to produce an electromagnetic field that further includes a first coil disposed in the interior volume of the body wherein the first coil is manufactured from copper wire.

An additional object of the present invention is to provide a wristwatch charging apparatus operable to provide wireless charging of a smart phone proximate thereto that further includes a second coil disposed in the interior volume of the body wherein the second coil is manufactured from copper wire.

Still another object of the present invention is to provide a wristwatch charging apparatus configured to produce an electromagnetic field that includes a power source, wherein the power source is electrically coupled to the first coil.

Yet an additional object of the present invention is to provide a wristwatch charging apparatus operable to provide wireless charging of a smart phone proximate thereto that further includes a charging port electrically coupled to the power source to provide charging thereof.

An additional object of the present invention is to provide a wristwatch charging apparatus configured to produce an electromagnetic field wherein the body includes a face surface that is operable to display information such as but not limited to the time of day.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
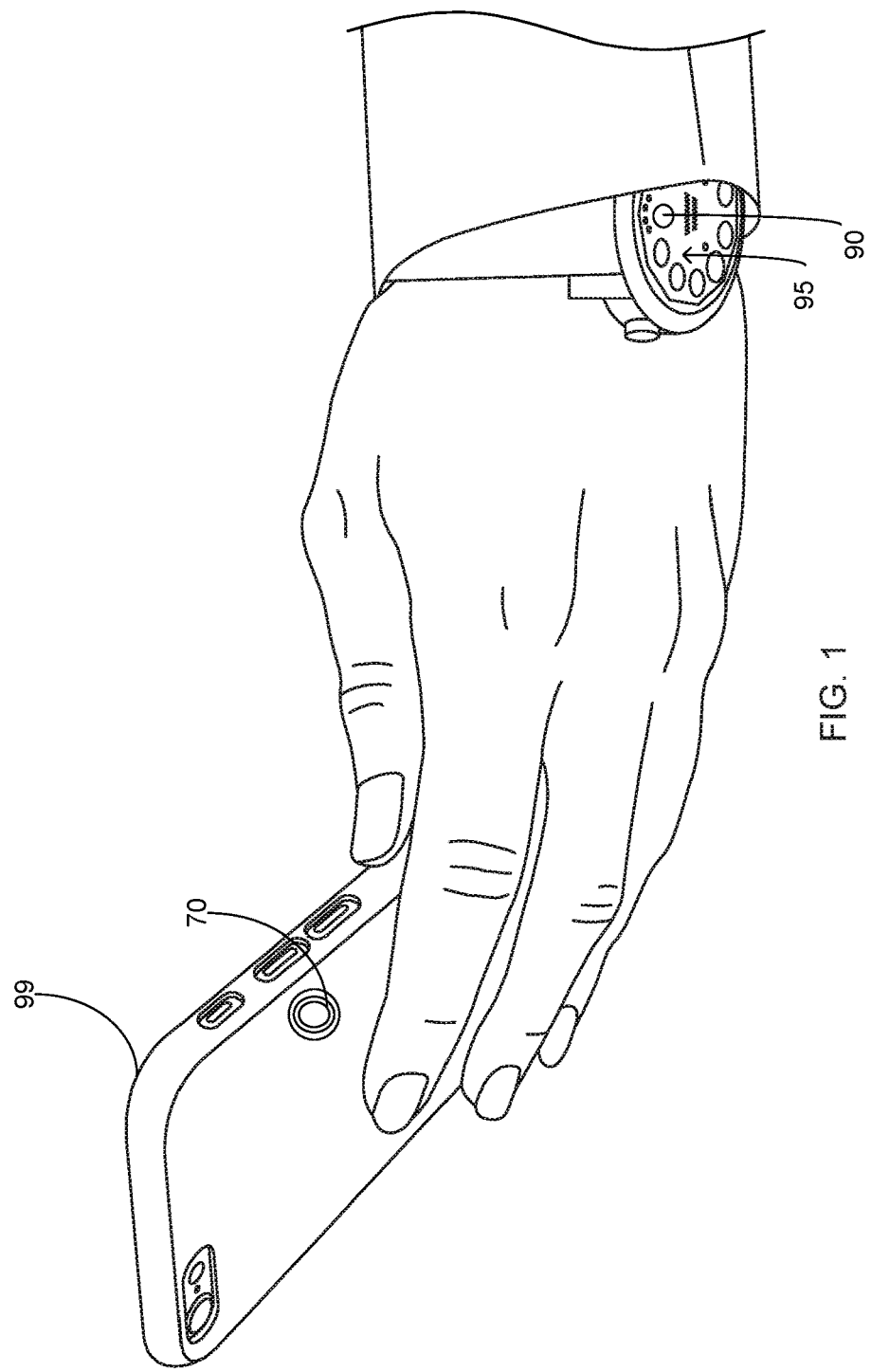
FIG. 1 is a perspective view of the present invention proximate a smart phone.

Referring now to the drawings submitted herewith, wherein various elements depicted therein are not necessarily drawn to scale and wherein through the views and figures like elements are referenced with identical reference numerals, there is illustrated a wristwatch charging apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
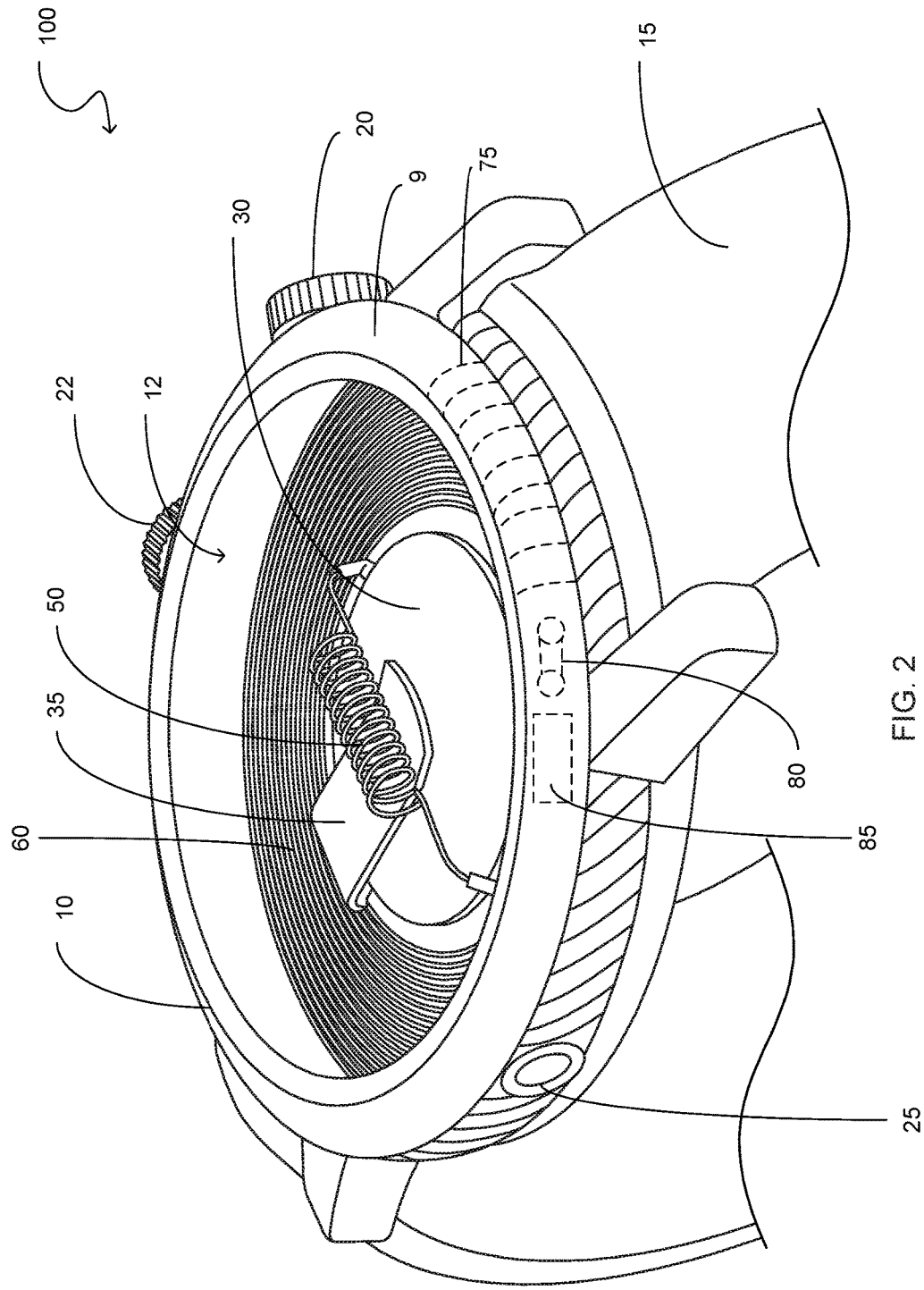
FIG. 2 is detailed view of the body and interior volume thereof of the present invention.
Figure 3:
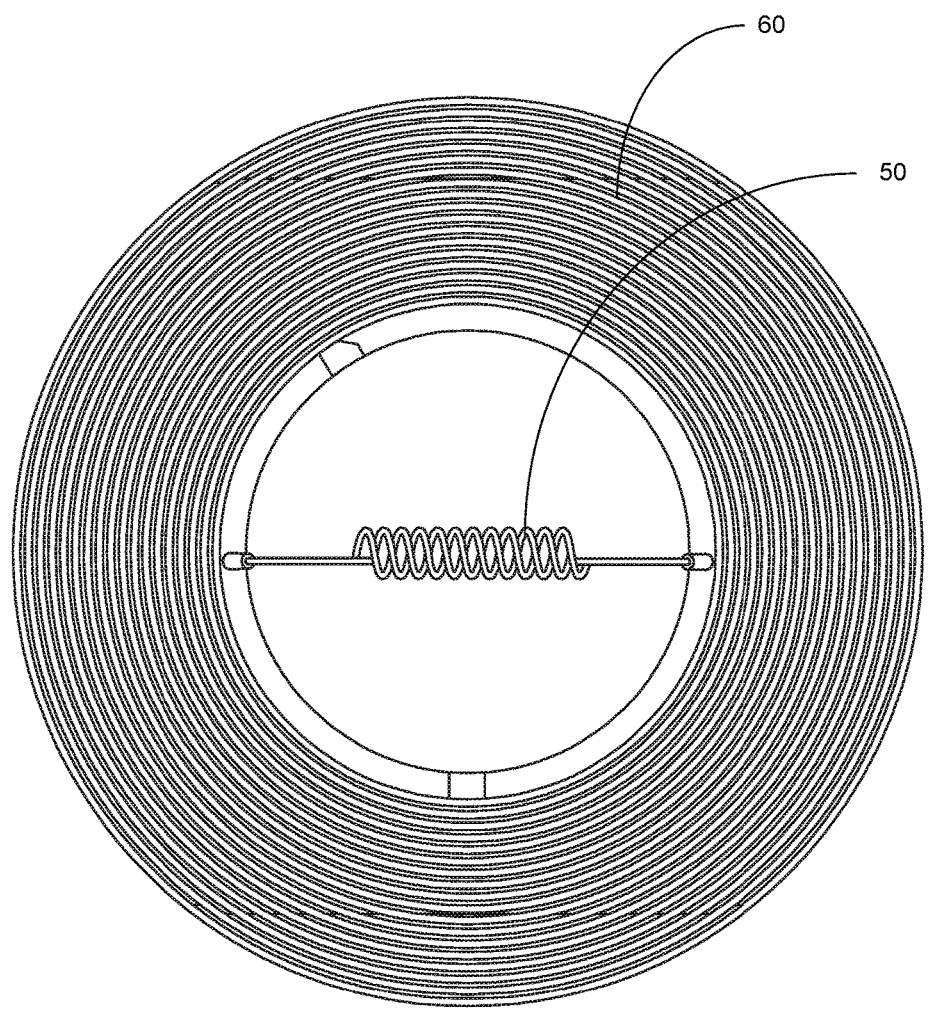
FIG. 3 is a diagrammatic view of the first coil and second coil of the present invention.

Now referring to FIG. 1 through FIG. 3 the wristwatch charging apparatus 100 includes a body 10. The body 10 is manufactured from a durable material such as but not limited to plastic or metal. The body 10 is annular in shape and includes an interior volume 12. While the body 10 is illustrated herein as being annular in shape it is contemplated within the scope of the present invention that the body 10 could be manufactured in alternate shapes and sizes. The body 10 has operably coupled thereto a strap 15 that is configured to releasably secure the wristwatch charging apparatus 100 to a wrist of a human being.

Secured to the perimeter of the body 10 are controls 20,22 and charging port 25. Controls 20, 22 are conventional electronic switches that are configured to provide features such as but not limited to powering the wristwatch charging apparatus 100 on and off and controlling input of data into the wristwatch charging apparatus 100. It should be understood by those skilled in the art that the wristwatch charging apparatus 100 could have alternate quantities of controls 20, 22 in order to execute the desired functionality of the wristwatch charging apparatus 100. A charging port 25 is located on the body 10 opposite the controls 20,22. The charging port 25 provides the necessary interface to couple the wristwatch charging apparatus 100 to a power source for charging of the battery 30. The charging port 25 is electrically coupled to the battery 30 utilizing suitable techniques so as to provide the necessary power to charge the battery 30. The battery 30 is a lithium ion battery and provides the necessary power to produce an electrical current through the first coil 50 as will be further discussed herein. While the preferred embodiment of the battery 30 is a lithium ion battery, it is contemplated within the scope of the present invention that alternate types of batteries could be utilized. The battery 30 is retained in its position by clip 35

A first coil 50 is superposed the battery 30 and is electrically coupled thereto. The first coil 50 is a wound coil of copper wire. While copper wire is the preferred wire for the first coil 50, it is contemplated within the scope of the present invention that the first could 50 could be manufactured from alternate types of metal wire that exhibit desirable conductivity. The first coil 50 is centrally disposed within the interior volume 12 of the body 10. The battery 30 being electrically coupled to the first coil 50 provides an electrical current therethrough. The electrical current flowing through the first coil 50 creates a magnetic field. A second coil 60 is surroundably present around first coil 50. The second coil 60 is manufactured from copper wire. As electrical current flows through the first coil 50 the magnetic flux through the second coil 60 changes thereby inducing current. The induction current produced is operable to be electrically coupled by an exemplary receiving coil 70 present in a smart phone 99. A user of the wristwatch charging apparatus 100 can select a charging mode utilizing the controls 20, 22 in order to commence an electrical current through the first coil 50 and as such induce a current from second coil 60 so as to provide electrical charging of a smart phone 99 proximate thereto. It is contemplated within the scope of the present invention that the first coil 50 and second coil 60 could be produced utilizing alternate quantities of copper wire windings in order to generate a desired electrical current. Furthermore, while a first coil 50 and second coil 60 are illustrated herein, it is contemplated within the scope of the present invention that the wristwatch charging apparatus 100 could have alternate quantities of the first coil 50 and second coil 60 in order to generate a desired electrical output.

It is contemplated within the scope of the present invention that the first coil 50 and second coil 60 could be alternately arranged to produce an electrical current to provide inductive charging of an exemplary smart phone 99. In the contemplated alternative embodiment a coil 75 is circumferentially disposed in the rim 9 of the body 10. The windings of the coil 75 are created so as to create a void similar to a tunnel therein allowing for magnets 80 to pass therethrough. Movably mounted within the rim 9 and internally positioned on the coil 75 are a plurality of magnets 80. The magnets 80 are moved utilizing a motor 85 or other suitable techniques wherein the magnets 80 move in a rapid orbital movement around the rim 9. While the coil 75 is illustrated herein along a portion of the rim 9, this is for illustrative purposes only and it should be understood that the coil 75 is completely circumferentially disposed around rim 9. As the magnets 80 are traversed through the coil 75 and electrical current is generated wherein the inductive current can be received by the exemplary receiving coil 70 present on smart phone 99.

The wristwatch charging apparatus 100 further includes a central processing unit 90. The central processing unit 90 includes the necessary electronics to store, receive, transmit and manipulate data. The central processing unit 90 is operably coupled to the battery 30 and additional elements of the wristwatch charging apparatus 100 so as to provide operation thereof. The central processing unit 90 is further operable to place the wristwatch charging apparatus 100 in a first mode or in a second mode. In the first mode the wristwatch charging apparatus 100 is activated so as to provide the induced current operable to charge the exemplary smart phone 99. In its second mode the wristwatch charging apparatus 100 does not provide an induced current. A display 95 is provided and is configured to display information such as but not limited to the time of day. The display 95 is a conventional LCD screen. While a display 95 that is electronic is illustrated herein, it is contemplated within the scope of the present invention that the wristwatch charging apparatus 100 could have a conventional analog watch face in place of the display 95.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A wristwatch configured to provide an induced electrical current that is operable to provide charging of a smart phone proximate thereto comprising:
- a body, said body having a perimeter rim, said body having an interior volume, said body having a strap secured thereto, said strap operable to releasably secure the wristwatch to a user;
- a battery, said battery being disposed within the interior volume of the body;
- a central processing unit, said central processing unit configured to store, receive, transmit and manipulate data, said central processing unit operably coupled to said battery;
- a coil, said coil being disposed within said perimeter rim of said body, said coil being formed so as to have a void therethrough, said coil being circumferentially disposed around said body;
- at least one magnet, said at least one magnet being movably mounted within said perimeter rim of said body, said at least one magnet configured to traverse through the void of said coil; and
wherein the at least one magnet is configured to orbitally traverse around said perimeter rim of said body so as to induce an electrical current that is operable to provide inductive charging of a smart phone proximate to the wristwatch.

2. The wristwatch as recited in claim 1, wherein said coil is manufactured from copper windings.

3. The wristwatch as recited in claim 2, wherein the wristwatch is operable in a first mode and a second mode, said first mode configured to provide an electromagnetic field so as to facilitate inductive charging of a smart phone proximate to the wristwatch.

4. The wristwatch as recited in claim 3, and further including a display, said display being secured to said body, said display configured to display time thereon.

5. The wristwatch as recited in claim 4, and further including a charging port, said charging port being present on said body, said charging port being electrically coupled to said battery.

6. The wristwatch as recited in claim 5, and further including at least one control, said at least one control being secured to said body, said at least one control being operably coupled to said central processing unit.

7. The wristwatch as recited in claim 6, wherein said battery is a lithium ion battery.

* * * * *